United States Patent [19]
Pfeffer et al.

[11] Patent Number: 5,236,056
[45] Date of Patent: Aug. 17, 1993

[54] METHOD FOR ASSISTING THE STEERING FORCES TO BE PRODUCED IN A VEHICLE

[75] Inventors: Peter Pfeffer, Lauffen/Neckar; Herbert Labitzke, Markgröningen; Peter Ahner, Ludwigsburg-Ossweil; Peter Kleindieck, Grossbottwar; Willibert Schleuter, Bietigheim-Bissingen; Uwe Kirberg, Markgröningen-Unterriexingen, all of Fed. Rep. of Germany

[73] Assignee: Robert Bosch GmbH, Stuttgart

[21] Appl. No.: 889,593

[22] Filed: May 18, 1992

Related U.S. Application Data

[63] Continuation of Ser. No. 566,361, Aug. 16, 1990, abandoned.

[30] Foreign Application Priority Data

Dec. 16, 1988 [DE] Fed. Rep. of Germany ....... 3842334
Dec. 2, 1989 [WO] PCT Int'l Appl. .................. PCT/DE89/00751

[51] Int. Cl.⁵ .............................................. B62D 5/04
[52] U.S. Cl. ................................. 180/79.1; 180/142; 318/433
[58] Field of Search ............... 180/79.1, 142; 318/539, 318/139, 432, 433

[56] References Cited

U.S. PATENT DOCUMENTS

| | | | |
|---|---|---|---|
| 4,471,280 | 9/1984 | Stack | 180/79.1 |
| 4,580,648 | 4/1986 | Murakami et al. | 180/79.1 |
| 4,629,952 | 12/1986 | Shimizu | 180/79.1 |
| 4,802,543 | 2/1989 | Ishikura et al. | 180/79.1 |

FOREIGN PATENT DOCUMENTS

| | | | |
|---|---|---|---|
| 301173 | 12/1988 | Japan | 180/79.1 |
| 2163110 | 2/1986 | United Kingdom | 180/79.1 |

*Primary Examiner*—Margaret A. Focarino
*Assistant Examiner*—Kevin Hurley
*Attorney, Agent, or Firm*—Walter Ottesen

[57] ABSTRACT

A method for assisting the steering forces to be produced in a vehicle by means of an electric motor acting on the steering column is proposed. This method is characterized in that the additional torque produced by the electric motor is controlled in dependence upon the steering torque to be produced for actuating the steering and upon the steering torque supplied overall. The additional torque is thus dependent on the torque which is produced at the steering wheel by the driver and, in addition, on the torque which is supplied by the steering arrangement on the wheels to be steered. The electric motor is controlled by a controller 5 via an actuator 6, an additional torque $M^*_R$, which is dependent on the vehicle speed, being input into the controller. As characteristic shaper, the controller has a dead-time element by which the control intervenes only from a certain limit value of the torque $M^*_R$ input into the controller 5. This results in a particularly good contact with the roadway for the driver in combination with optimal assistance to the steering forces.

21 Claims, 1 Drawing Sheet

METHOD FOR ASSISTING THE STEERING FORCES TO BE PRODUCED IN A VEHICLE

This is a continuation of application Ser. No. 07/566,361, filed Aug. 16, 1990, abandoned.

FIELD OF THE INVENTION

The invention relates to a method for assisting the steering forces to be produced in a vehicle.

BACKGROUND OF THE INVENTION

In a known method of this kind, an electric motor is combined, for example, with a recirculating ball steering system. Due to the friction within the steering system, the reaction of the forces acting on the steering from the road is damped. The friction leads to a so-called torque hysteresis of the steering gear, that is, opposing steering torques do not have the direct effect of torque at the output of the gear. A disadvantage of this method is the fact that the steering comfort is not optimal at all vehicle speeds due to the fixed hysteresis.

Various methods for improving the characteristics of a steering assistance system are described in published British patent application GB 2 163 110 A and the Japanese patent abstract 63-301173 (A). It has been found that these methods do not cover all driving conditions with regard to a high steering comfort and a good contact of the driver with the roadway since the characteristics of the steering gear are largely not taken into account.

SUMMARY OF THE INVENTION

In contrast, the method according tot he invention has the advantage that the steering comfort is increased because the "bumpiness" can be controlled as a function of the speed of travel. This is achieved, in particular, by the fact that the additional torque produced by the electric motor is chosen as a function of the steering torque and the output torque of the steering gear.

A preferred embodiment of the method is one in which the additional torque is controlled by means of a characteristic shaper and of a downstream amplifier. Particularly preferred here is a characteristic shaper designed as a dead-time element, the assistance of the steering forces thus being suppressed in a range of small torque differences. Only when relatively large differences between steering torque and output torque are present does the assistance intervene. In such a method, there is particularly good contact with the roadway at all driving speeds, that is, the driver receives an optimal feel for the condition of the roadway.

A particularly preferred embodiment of the method is one in which a stepped curve shape is chosen as actuating characteristic of the actuating-characteristic shaper. When a certain limit value of the torque difference is exceeded, the steering aid is activated and intervenes with a controlled additional torque in the steering arrangement. This means that an additional force is introduced into the system in addition to the steering force produced by the driver.

A particularly preferred method is one in which the limit values at which the steering aid is activated are chosen as a function of the speed of the vehicle. It is thereby possible to make the width of hysteresis dependent on the vehicle speed. This has the result that the driver has an optimal feel for the condition of the roadway, particularly at high speed.

BRIEF DESCRIPTION OF THE DRAWINGS

The invention is explained in greater detail below with reference to the drawing, in which.

DESCRIPTION OF THE PREFERRED EMBODIMENTS OF THE INVENTION

Figure 1:
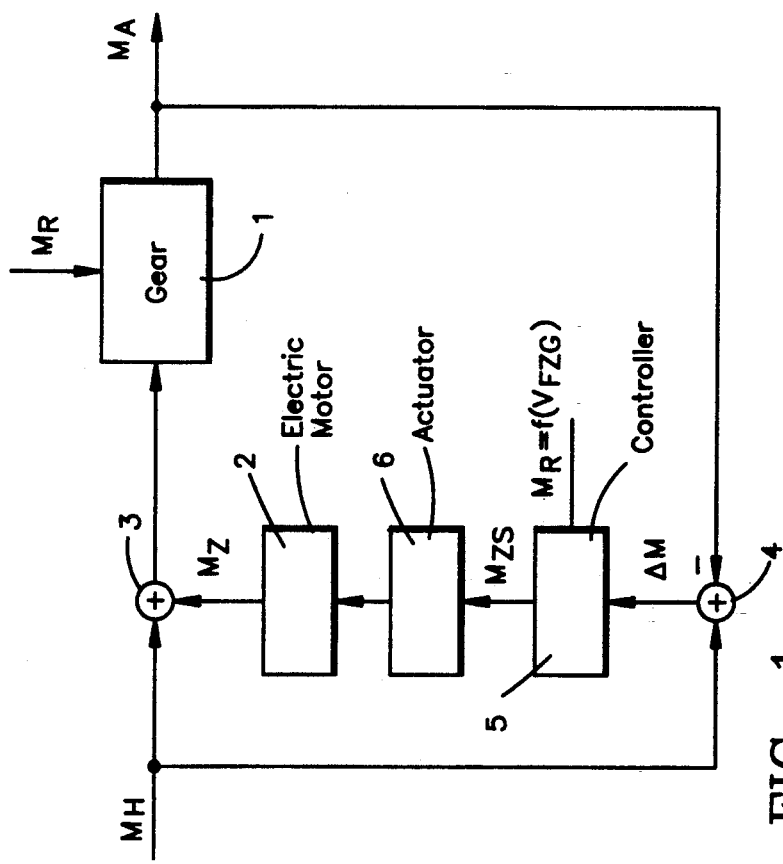
FIG. 1 shows a block diagram to illustrate the method according to the invention.

FIG. 1 shows a steering gear 1 between a steering wheel (not shown here) and the steered wheels of a vehicle (likewise not shown here). In the schematic sketch, a gear with a transmission ratio ü=1 is taken as a basis. The steering gear 1 supplies an output torque $M_A$ to the steered wheels of the vehicle. The friction of the gear 1, due to its construction, is here indicated by a frictional torque $M_R$. The steering torque to be produced manually by the driver of the vehicle is denoted by $M_H$. Not only is the torque $M_H$ produced by the driver introduced into the gear 1 but also an additional torque $M_Z$, which is produced, for example, by an electric motor 2 which intervenes directly or via a suitable gear in the steering linkage between the steering wheel and the gear 1. An addition of the two torques $M_H$ and $M_Z$ thus takes place. A first adder 3 is represented in FIG. 1 here in order to illustrate this function. With the aid of a second adder 4, the difference of the torque $M_H$ produced by the driver of the vehicle and the output torque $M_A$ of the gear 1 is formed. The torque difference $\Delta M = M_H - M_A$ is input into a controller 5, which acts on the electric motor 2 via an actuator 6.

A frictional torque $M^*_R$, here chosen as a function of the vehicle speed v, is input into the controller. However, this frictional torque can also be constant or dependent on some other variable.

The output signal of the controller 5 is designated desired additional torque $M_{ZS}$. This additional torque is input into the actuator 6.

In the actuator 6, the output signal of the controller 5 is converted into a variable voltage, which is applied to the electric motor 2. This motor supplies an additional torque $M_Z$ to the first adder 3.

It is thus the sum of the torques $M_H$ and $M_Z$ which is input into the gear 1.

Figure 2:
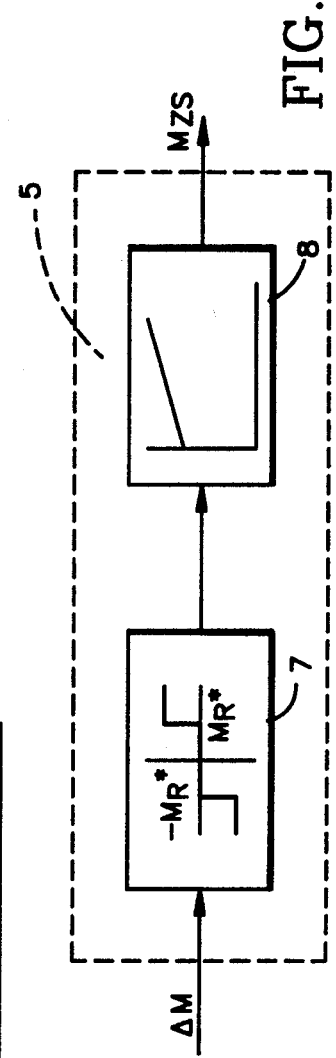
FIG. 2 shows a block diagram of the controller illustrated in FIG. 1.

The controller 5 can, for example, include a characteristic shaper 7 and an amplifier 8 which is connected downstream of the shaper 7. This embodiment is illustrated in FIG. 2. The torque difference formed from $M_H$ and $M_A$ is input into the characteristic shaper. The characteristic shaper illustrated in FIG. 2 is a dead-time element which has two limit values, namely $-M^*_R$ and $M^*_R$. The two limit values are preferably equal in magnitude, the dead-time element thus being of symmetrical design. If required, it is also possible to use a dead-time element having limit values, the magnitudes of which are not equal. The actuating characteristic of the curve shaper 7 represents a discontinuous function which, in the range $-M^*_R \leq M \leq M^*_R$, assumes the value zero, below the lower limit value assumes a constant negative value and above the upper limit value assumes a constant positive value.

Instead of the stepped shape, the actuating characteristic can assume a linear curve shape in the region lying outside the limit values.

The output signal of the curve shaper 7 is input to the amplifier 8.

From the curve shape indicated in FIG. 2 for the amplifier 8 it can be seen that a PI-controller has been chosen as amplifier in the present example.

Figure 3:
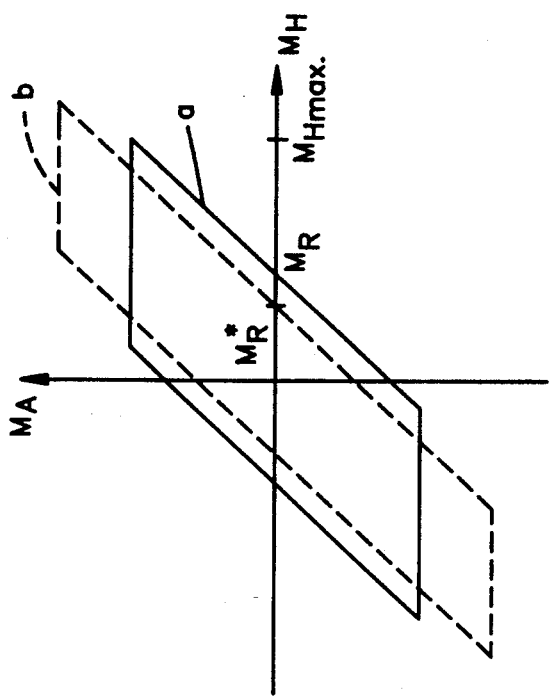
FIG. 3 shows the curve of the hysteresis of a steering arrangement.

It is also possible to use a P-controller instead, but this then results in an altered curve shape in FIG. 3: the rising and the falling lines are distorted. The basic principle of hysteresis reduction is retained however.

FIG. 3 shows a diagram in which the progression of the output torque $M_A$ at the output of the steering gear 1 is plotted against the torque $M_H$ to be produced at the steering wheel. The torque curve without the closed-loop control of the invention is represented by a solid line (curve a). The dashes represent the curve of the torque using the closed-loop control according to the invention (curve b).

The frictional torque $M_R$ of the steering gear 1 results in the parallelogram-like curve shape. In both curves, the horizontal curve portions are due to the friction of the gear. The point of intersection of the curve a with the abscissa is given by the frictional moment $M_R$ of the gear 1, the point of intersection of the dashed curve b with the abscissa is given by the limit value $M^*_R$ of the characteristic shaper 7, at which the closed-loop control of the controller 5 starts.

When the limit value $M^*_R$ is exceeded, the controller 5 responds and supplies a control signal to the electric motor 2 via the actuator 6. This results in an additional moment $M_Z$ to be supplied to the gear 1 when the limit value is exceeded. From FIG. 3, it can be seen that the hysteresis is reduced by the influence of the controller. The parallelogram for curve shape b, drawn in dashed lines, is narrower than that for curve shape a without closed-loop control.

The controller 5 illustrated in FIG. 1 can be designed as an analog system but can also be realized as a microcontroller with software.

To measure the torque $M_H$ produced manually at the steering wheel and the output torque $M_A$ of the gear 1, sensors are integrated into the power train, converting the torque into signals which can be electrically evaluated. The difference of the two torques can be formed directly by the controller 5, at least if it is designed as a controller.

By means of appropriate sensors, the vehicle speed is determined in order to adjust the limiting value $M^*_R$ as a function of this parameter. The value of this friction torque which is input into the controller 5 can here be taken from a characteristic field.

From the difference signal of the two torques and the friction value, the controller 5 generates a pulsewidth-modulated signal, from which the actuator 6, which is designed, for example, as a power controller, generates a drive signal for the electric motor 2. The motor can intervene directly in the steering linkage. However, a suitable gear unit can also be interposed.

From the foregoing, it can be seen that, with the aid of the method described, the hysteresis of the steering system is reduced. This is readily visible from the curve shapes reproduced in FIG. 3. The horizontal curve portion in the curve b represented in dashed lines is considerably shorter than the horizontal part of the curve a represented in solid lines, which was recorded without a control method of the type described here.

We claim:

1. A method for assisting the steering torque to be produced in a vehicle having a steering column acted upon manually by the driver with manual steering torque and the vehicle having an electric motor acting additionally on the steering column with additional torque and having a steering gear receiving an input torque in the form of a superposition of said manual steering torque and said additional torque and supplying an output torque to the steered wheels of the vehicle, the method comprising the steps of:

measuring said manual steering torque applied by the driver;

measuring said output torque of the steering gear; and, controlling the additional torque produced by the electric motor in dependence upon said measured manual steering torque and said measured output torque of the steering gear.

2. The method of claim 1, further comprising the steps of:

forming a difference of said measurement manual steering torque and said measured output torque; and, applying said difference to a controller for controlling said additional torque produced by said electric motor in dependence upon said formed difference.

3. An arrangement for assisting the steering torque to be produced in a vehicle having a steering column acted upon manually by the driver with manual steering torque and the vehicle having an electric motor acting additionally on the steering column with additional torque and having a steering gear receiving an input torque in the form of a superposition of said manual steering torque and said additional torque and supplying an output torque to the steered wheels of the vehicle, the arrangement comprising:

first sensor means for measuring the manual steering torque;

second sensor means for measuring said output torque of said steering gear;

controller means for controlling the additional torque produced by the electric motor in dependence upon said measured manual steering torque and upon said measured output torque of the steering gear thereby considering characteristics of the steering gear including friction developed therein; and, said controller means including a characteristic shaper and an amplifier connected downstream thereof for controlling said additional torque.

4. An arrangement for assisting the steering torque to be produced in a vehicle having a steering column acted upon manually by the driver with manual steering torque and the vehicle having an electric motor acting additionally on the steering column with additional torque and having a steering gear receiving an input torque in the form of a superposition of said manual steering torque and said additional torque and supplying an output torque to the steered wheels of the vehicle, the arrangement comprising:

means for controlling the additional torque produced by the electric motor with the aid of a characteristic shaper and an amplifier connected downstream of said shaper in dependence upon the steering torque to be developed for actuating the steering and upon the output torque of the steering gear; and, means for utilizing the characteristic shaper in the form of a dead-time element so that the closed-loop control is activated after at least one of a first predeterminable limit value has been exceeded and a second predeterminable limit value has been undershot.

5. The arrangement of claim 4, wherein the amounts of the two limits values are the same.

6. The arrangement of claim 4, wherein the limit values are chosen in dependence upon the speed of the vehicle.

7. The arrangement of claim 4, wherein a stepped curve shape is selected as an actuating characteristic of the characteristic shaper outside the dead zone of the dead-time element.

8. The arrangement of claim 4, wherein a linear curve shape is selected as an actuating characteristic of the characteristic shaper outside the dead zone of the dead-time element.

9. A method for assisting the steering torque to be produced in a vehicle having a steering column acted upon manually by the driver with manual steering torque and the vehicle having an electric motor acting additionally on the steering column with additional torque and having a steering gear receiving an input torque in the form of a superposition of said manual steering torque and said additional torque and supplying an output torque to the steered wheels of the vehicle, the method comprising the step of:

controlling the additional torque produced by the electric motor with the aid of a characteristic shaper and a P-controller connected downstream of said shaper in dependence upon the steering torque to be developed for actuating the steering and in dependence upon the output torque of the steering gear.

10. A method for assisting the steering torque to be produced in a vehicle having a steering column acted upon manually be the driver with manual steering torque and the vehicle having an electric motor acting additionally on the steering column with additional torque and having a steering gear receiving an input torque in the form of a superposition of said manual steering torque and said additional torque and supplying an output torque to the steered wheels of the vehicle, the method comprising the step of:

controlling the additional torque produced by the electric motor with the aid of a characteristic shaper and a PI-controller connected downstream of said shaper in dependence upon the steering torque to be developed for actuating the steering and in dependence upon the output torque of the steering gear.

11. In a motor vehicle including: a steering column having a steering wheel to which an operator applies a manual steering torque; an electric motor for acting additionally on the steering column with an additional torque; and, a steering gear unit for providing an output torque in response to said steering torque and said additional torque and wherein an ancillary torque is developed which is included in said output torque; the method comprising the steps of:

measuring said manual steering torque applied by the driver;

measuring said output torque of the steering gear;

forming the difference of said measured manual steering torque and said measured output torque; and, controlling said additional torque produced by said electric motor in dependence upon said measured manual steering torque and said measured output torque.

12. The method of claim 11, further comprising the step of applying said difference to a controller for controlling said additional torque produced by said electric motor in dependence upon said formed difference.

13. In a motor vehicle equipped with a steering column and a steering wheel mounted on the steering column to which an operator applies a manual steering torque and, a steering gear unit for providing an output torque for turning the wheels of the motor vehicle, an arrangement for assisting the steering torque to be produced in the motor vehicle, the arrangement comprising:

first sensor means for measuring said manual steering torque;

second sensor means for measuring said output torque of said steering gear unit;

an electric motor for generating an additional torque;

first adding means for adding said measured manual steering torque and said additional torque generated by said electric motor to form a first superposed torque;

said steering gear unit having particular characteristics and wherein friction is developed;

said steering gear unit being connected to said first adding means for receiving said first superposed torque and for providing an output torque;

second adding means for adding said measured manual steering torque and said measured output torque to produce a second superposed torque; and, controller means for receiving said second superposed torque and for generating a variable for driving said electric motor to produce said additional torque.

14. In a motor vehicle equipped with a steering column and a steering wheel mounted on the steering column to which an operator applies a manual steering torque and, a steering gear unit for providing an output torque for turning the wheels of the motor vehicle, an arrangement for assisting the steering torque to be produced in the motor vehicle, the arrangement comprising:

an electric motor for generating an additional torque;

first adding means for adding said manual steering torque and said additional torque generated by said electric motor to form a first superposed torque;

said steering gear unit having particular characteristics and wherein friction is developed;

said steering gear unit being connected to said first adding means for receiving said first superposed torque and for providing an output torque;

second adding means for adding said manual steering torque and said output torque to produce a second superposed torque;

controller means for receiving said second superposed torque and for generating a variable for driving said electric motor to produce said additional torque; and, said controller means including a characteristic shaper and an amplifier connected downstream of said characteristic shaper.

15. The arrangement of claim 14, said characteristic shaper being in the form of a dead-time element so that the closed-loop control is activated after a first predeterminable limit value has been exceeded and/or a second predeterminable limit value has been undershot.

16. The arrangement of claim 15, wherein said two limit values are the same.

17. The arrangement of claim 15, wherein the limit values are chosen in dependence upon the speed of the vehicle.

18. The arrangement of claim 15, wherein a stepped curve shape is selected as an actuating characteristic of the characteristic shaper outside the dead zone of the dead-time element.

19. The arrangement of claim 15, wherein a linear curve shape is selected as an actuating characteristic of the characteristic shaper outside the dead zone of the dead-time element.

20. The arrangement of claim 14, wherein said amplifier is a P-controller.

21. The arrangement of claim 14, wherein said amplifier is a PI-controller.

* * * * *